Sept. 30, 1958 G. E. THORN ET AL 2,853,770
BOTTLE STOPPER ASSEMBLING MACHINE
Filed Oct. 3, 1955 5 Sheets-Sheet 1
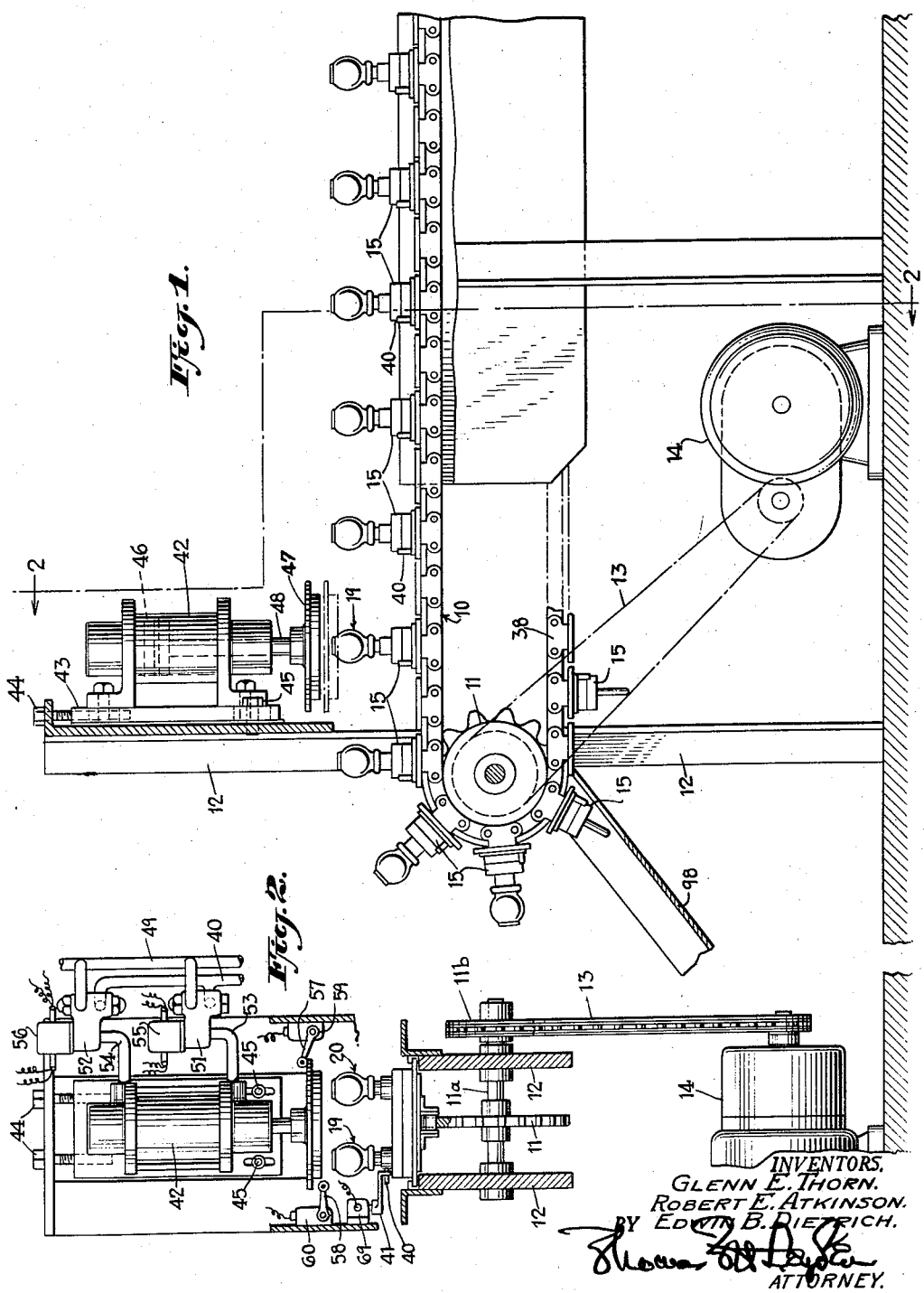
INVENTORS.
GLENN E. THORN.
ROBERT E. ATKINSON.
BY EDWIN B. DIETRICH.
ATTORNEY.

Sept. 30, 1958   G. E. THORN ET AL   2,853,770
BOTTLE STOPPER ASSEMBLING MACHINE
Filed Oct. 3, 1955   5 Sheets-Sheet 2

INVENTORS.
GLENN E. THORN.
ROBERT E. ATKINSON.
BY EDWIN B. DIETRICH
ATTORNEY.

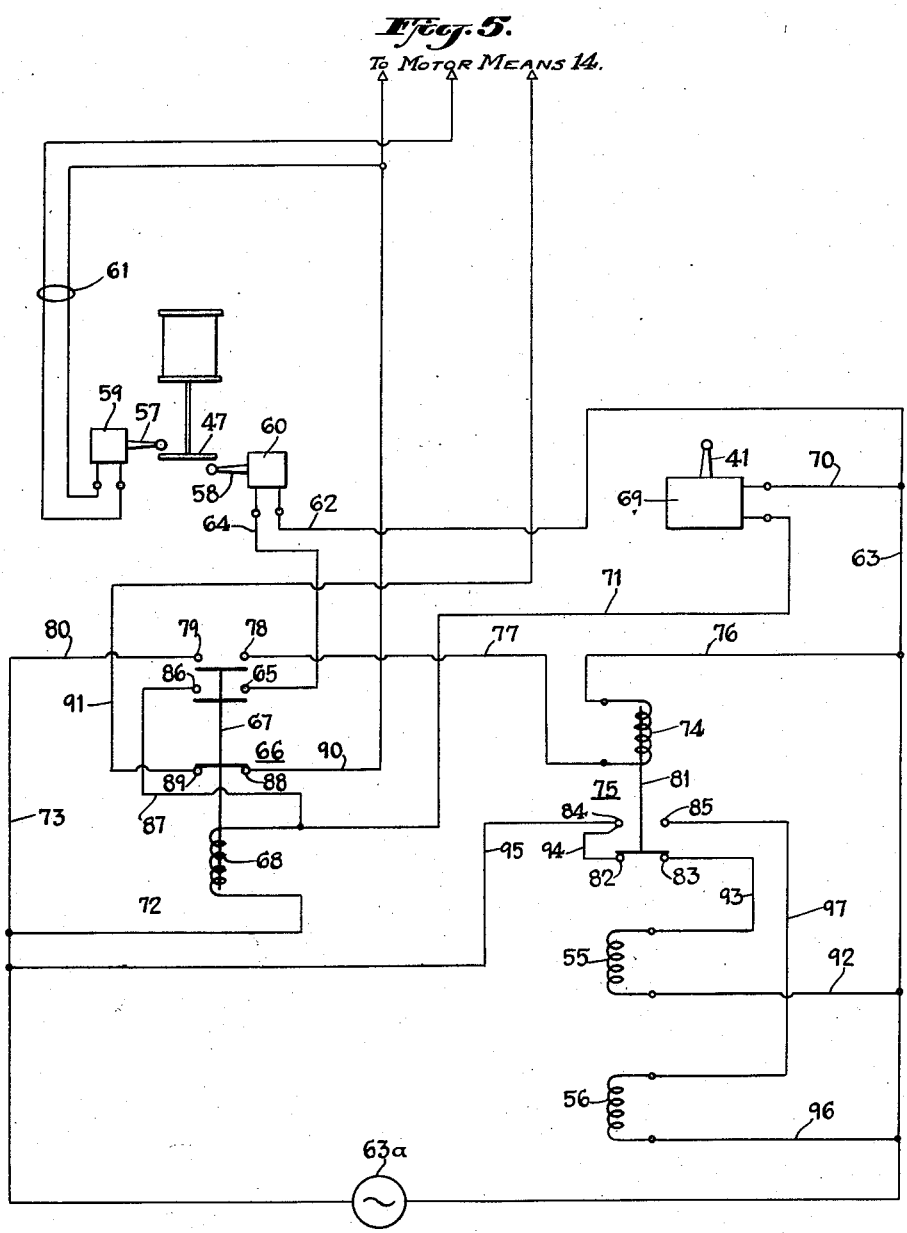

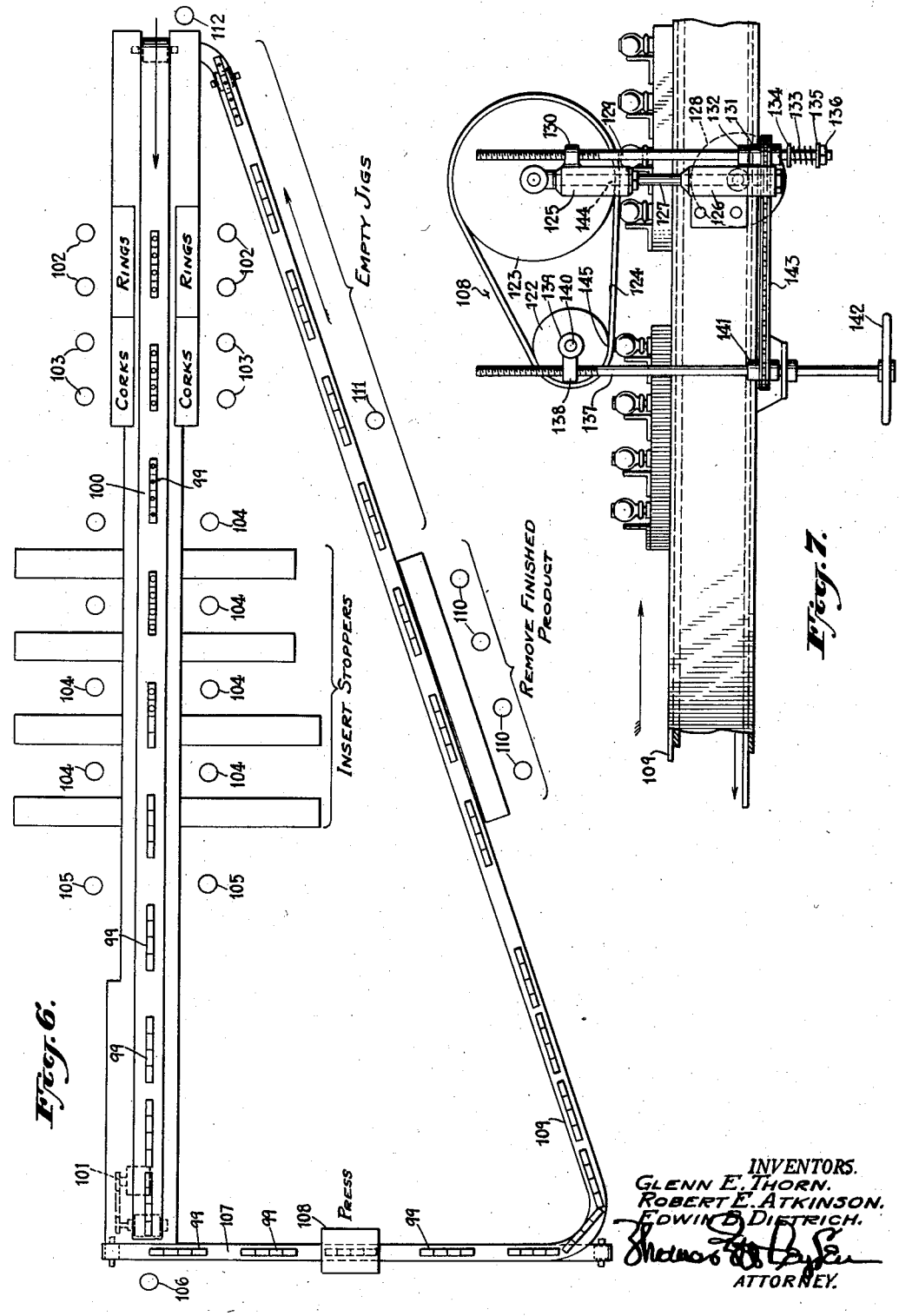

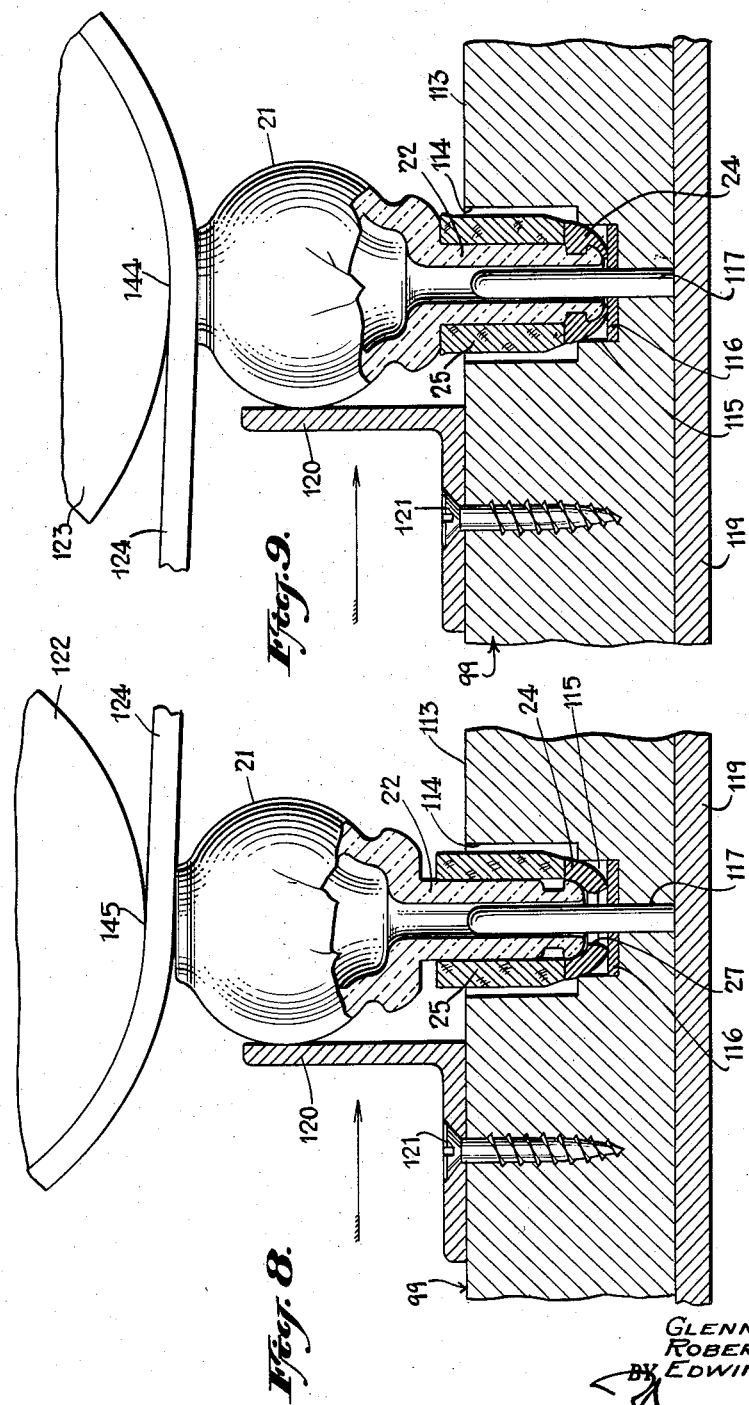

United States Patent Office 2,853,770
Patented Sept. 30, 1958

2,853,770

BOTTLE STOPPER ASSEMBLING MACHINE

Glenn E. Thorn and Robert E. Atkinson, Cincinnati, Ohio, and Edwin B. Dietrich, Millbourne, Pa., assignors to Schenley Industries, Inc., New York, N. Y., a corporation of Delaware Application October 3, 1955, Serial No. 538,112

2 Claims. (Cl. 29—208)

This invention relates generally to apparatus useful in mass production of composite bottle stoppers, for assembling a plurality of such stopper components to be pressed into assembled relationship and, more particularly, it is concerned with apparatus for assembling large quantities of multi-component stoppers whose components are pressed into interfitting relationship.

In United States patent application Serial No. 381,300, filed September 21, 1953, entitled "Bottle Stopper" now U. S. Patent No. 2,774,501, and assigned to the same assignee as the present application, there is described a stopper comprising a glass member having a hollow bulbous head, from which extends a tubular shank, integral with said head, with its bore communicating with the interior of the head at one end and open at the other or distal end. Preferably, the shank is provided with an external taper having its maximum diameter near its proximal end and its minimum diameter near its distal end. A tubular sheath, formed of a resilient material such as cork or a polyalkylene plastic, and shorter in length than the shank, is mounted on the shank in frictional gripping engagement therewith, the internal diameter of the sheath, in its unstretched state, being slightly smaller than the maximum diameter of that portion of the shank with which it engages when in its assembled position.

Near the end of the shank remote from the head and projecting beyond the end of the sheath, a circumferentially extending groove is formed for receiving and engaging with a resilient, retaining annulus which, for example, may be made of polyethylene or the like. The inner diameter of the annulus, when in its unstretched state prior to being mounted on the shank, is less than the diameter of the shank portion axially extending from the groove toward the open end of the shank, so that the shank causes the annulus to stretch as it is forced into position in the groove. Preferably, the annulus is provided on its inner surface with a radially extending rib which causes it to exert an axially directed compressive force against the sheath when the annulus is in the desired position on the shank.

It will be apparent from the above that as the glass member is assembled with the sheath and the annulus, these latter components are stretched and therefore, unless they are stretched by other means prior to inserting the shank of the glass member therein, the shank of the glass member must be forced or pressed into the sheath and the annulus. During this pressing operation, it is obvious that the components must be held in proper axial alignment and should be prevented from tilting with respect to each other. Also, during one part of the pressing operation, the open end of the shank of the glass member preferably extends beyond the annulus, so that it is desirable that means be provided for permitting such positioning of the shank without damaging the relatively fragile end thereof.

One of the objects of this invention is to provide apparatus for facilitating rapid and simple assembly of multi-component composite stoppers of the above-mentioned type and to provide apparatus of a type particularly suitable for mass production of such stoppers.

A further object of this invention is to provide electrical control circuits for the above-mentioned apparatus adapted to cause intermittent operation thereof for certain purposes hereinafter described.

Other objects and advantages of the invention will be apparent hereinafter from the following detailed description of the presently preferred embodiment of this invention, which description is to be considered in connection with the accompanying drawings wherein:

Fig. 1 is a fragmentary, side elevational view of one embodiment of the invention;

Fig. 2 is a fragmentary, end elevational cross-sectional view of the embodiment shown in Fig. 1 and is taken along the line 2—2 indicated in Fig. 1;

Fig. 5 is a circuit diagram of the control circuits for the apparatus shown in the preceding figures;

Fig. 6 is a diagrammatic, plan view of a further embodiment of the invention;

Fig. 7 is an enlarged, fragmentary, elevational view of a portion of the apparatus used in connection with the embodiment shown in Fig. 6; and Figs. 8 and 9 are enlarged, fragmentary, elevational views of a portion of the apparatus shown in Figs. 6 and 7 and illustrate, respectively, the positions of the stopper components before and after being pressed into assembled relation.

Figure 3:
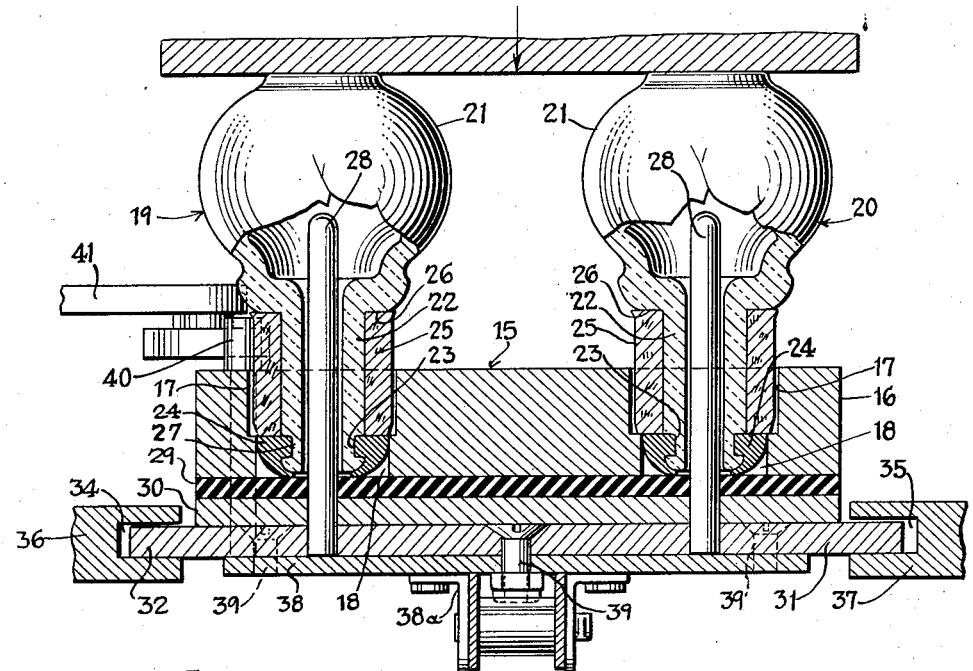
Fig. 3 is an enlarged cross-sectional view of a portion of the apparatus shown in Figs. 1 and 2.

In the embodiment of the invention shown in Figs. 1–5, the components of the stopper are assembled in jigs mounted on and carried by a conveyor which intermittently moves the jigs and the components supported thereon into position below a ram which presses the components into assembled relationship while movement of the conveyor is stopped. After the components have been pressed into assembled relationship, the ram is withdrawn and the conveyor is restarted, causing removal of the completed assembled stoppers and the insertion of a jig with another set of stopper components in pressing position below the ram.

Referring now to Fig. 1, it will be seen that the conveyor comprises a chain 10 which extends partly around a driving sprocket 11, mounted on a shaft 11a which is supported by a conveyor supporting frame 12. Shaft 11a is turned by a driving wheel 11b which is connected by driving means 13, e. g. a belt or chain, to a power source 14 which, for example, may be an electric motor provided with a suitable speed reducing mechanism. A plurality of jigs 15, described hereinafter in detail, are mounted on the chain 10 and are secured thereto so as to follow the chain 10 even when the jigs 15 are in inverted positions below the wheel 11 occupied by certain of the jigs 15 as shown in Fig. 1.

Figure 4:
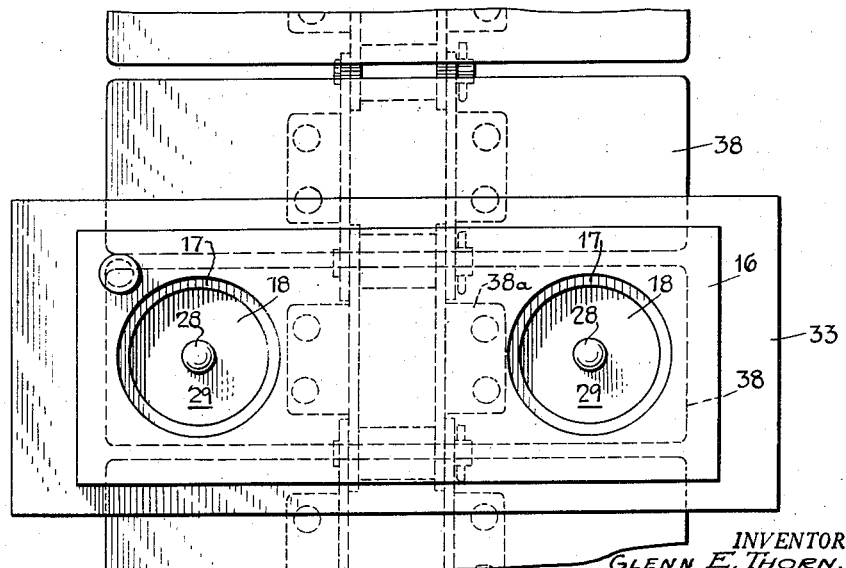
Fig. 4 is a plan view of the portion of the apparatus shown in Fig. 3.

The jigs 15 and the conveyor chain 10 are shown in greater detail in Figs. 3 and 4. As shown in these figures, each jig 15 comprises a block portion 16, which may be made of metal, wood or plastic, having a plurality of vertically disposed well-like openings 17 and 18 formed therein. Each of the jigs 15, as illustrated in connection with this embodiment of the invention, is adapted to receive components for two stoppers, although it will be understood that, in accordance with this invention, jigs may be adapted to receive components for a greater or lesser number of stoppers, as may be desired.

The stoppers 19 and 20 shown in Fig. 3 are identical and each comprises a glass member having a hollow bulbous head 21 and a hollow shank 22, integrally formed with the head 21. At its upper or proximal end, the bore of the tubular shank 22 communicates with the hollow interior of the head 21, and the lower or distal end of the bore is open.

The shank 22 is provided with a circumferentially extending groove 23, formed in its outer surface near the distal end thereof, adapted to receive a resilient annulus 24, which is made of a rubber-like material such as polyethylene or the like.

A tubular sheath 25 is positioned upon and extends along the shank 22 but its length is less than the length of the shank whereby the distal end of the shank projects from the sheath. The sheath 25, which may be made of cork, resilient plastic or the like, is adapted to provide a liquid-tight seal between the glass member and an encircling mouth of a bottle with which the stopper may be used. One end of the sheath 25 abuts against a shoulder portion 26 of the head 21, and the opposite end of the sheath 25 terminates adjacent the groove 23. Preferably, the diameter of the shank 22 decreases from its upper or proximal to its lower or distal end, providing an externally tapering hollow spindle and the inner diameter of the sheath 25, when in unstretched condition, is slightly less than the maximum diameter of that portion of the shank 22 received within the sheath 25. Accordingly, when the sheath 25 is forced into the position shown in Fig. 3, it is stretched and tightly grips the surface of the shank 22.

The annulus 24 is provided with an integrally formed annular rib 27 which extends radially inwardly and is adapted to be received in and to engage with the grooved portion of the shank 23. When the annulus is in unstretched condition, the diameter of the inner surface of the rib 27 is less than the diameter of the bottom of the groove 23 and, of course, is less than the diameter of that distal end portion of the shank 22 wherein the groove 23 is located, so that when the annulus 24 is forced onto the end of the shank 22, the rib on the annulus locks on the end of the shank. In addition, the rib 27 tends to exert axially directed compressive force against the sheath substantially in the manner described in the aforesaid copending application. Referring particularly to Fig. 3, it will be noticed that when the glass member, the sheath 25 and the annulus 24 are in assembled relationship, the annulus 24 applies an axially directed compressive force to the sheath 25, acting along the axis of the stopper and, hence, axially of the sheath 25.

In Fig. 3 it will be noticed that a pair of assembled composite stoppers are shown positioned on the jig. The sheath 25 is received in the well-like opening 17 in the jig and the annulus 24 is received in the well-like opening 18. The jig is also provided with a plurality of vertically disposed centering pins 28 which are mounted in and extend upwardly from the bottoms of the well-like openings 17 and 18 along the axes thereof. The pins 28 are received in the tubular portions or bores of the glass members 21 whereby the glass members 21 are held in alignment with the sheaths 25 and the annuli 24 and tipping of the glass members 21 and the sheaths 25 prior to completion of the assembling operation is prevented.

It has been found desirable, during the pressing of the sheath 25 and the annulus 24 onto the shank 22 of the glass member, to cause the lowermost or distal end of the shank 22 to extend below the lowermost surface of the annulus 24. To permit such positioning of the glass member 21 without damage thereto, while still restraining the annulus 24 and sufficiently to force it into locked engagement with the groove 23, the jigs 15 are provided with resilient cushioning pads 29, portions of which are disposed at the bottoms of the openings 18. The pads 29 permit the lowermost end portion of the shank 22 to be forced downwardly below the lowermost surface of the annulus 24 during the assembling operation, while at the same time it applies an upwardly directed counter force, acting against the annulus 24, causing the rib 27 thereof to enter and engage with the groove 23. The cushion 29, for example, may be made of rubber or any similar resilient material which will permit the aforesaid desired movement of the glass member 21 without damage thereto.

The bottom of the jig 15 comprises a shim plate 30 and a base plate 31. Preferably, the shim plate 30 is made of a hard material such as wood or plastic and it is of a thickness determined by the height of the block 16 when mounted upon the conveyor; it acts as a shim permitting proper adjustment of the positions of the work pieces.

The base plate 31 preferably is made of hardened steel and serves, also, as a guide plate. Of course, if it is unnecessary to provide a shim plate 30 and this plate may be omitted, and the plate 31 forms the bottom of the jig 15.

The ends 32 and 33 of the plate 31 are received in channels 34 and 35 in guide rails 36 and 37 extending in parallelism along the sides of the conveyor. The rails 36 and 37 serve both to guide the movement of the jigs 15 and to support the jigs 15 during the pressing of the stopper components hereinafter described.

The jig base plates 31 are secured by suitable fastening means, such as by screws 39, to plates 38, attached to links 38a of the conveyor chain 10, whereby the jigs 15 are moved with the links and cannot fall or become disengaged therefrom even when they are in inverted position during the return of the jigs 15 from the stopper assembling position to the loading position for the stopper components.

Each of the jigs 15 is provided with an upstanding sleeve 40 mounted on the upper surface of the block 16. The sleeve 40 actuates a switch arm 41 for purposes hereinafter described.

As shown in Figs. 1 and 2, a pneumatic cylinder 42 is adjustably mounted on the frame 12 in a position overlying the conveyor, the cylinder 42 being secured to a base plate 43 which may be vertically adjusted by means of screws 44 and retained in its adjusted position by means of screws 45.

The pneumatic cylinder 42 is provided with a piston 46 connected to a ram 47 by means of a piston rod 48. Air under pressure is supplied to the cylinder 42 by line 49 from a suitable source (not shown) and air is exhausted from the cylinder 42 by line 50, the lines 49 and 50 being connected to the pneumatic cylinder 42 through electrically operated valves 51 and 52 and lines 53 and 54. The valves 51 and 52 are controlled by solenoids 55 and 56 which are energized in the manner hereinafter described.

Thus, when the solenoid 56 is energized, the valve 52 operates to permit air to enter the cylinder 42 through line 54 and to cause the piston 46 and, hence, the ram 47, to move downwardly, the air from the lower half of the cylinder 42 being exhausted through valve 51, which is open when the solenoid 55 is de-energized.

Conversely, when the solenoid 55 is energized, the valve 51 is operated, causing piston 46 and, hence, the ram 47 to move upwardly, the solenoid 56 being de-energized at this time, thereby permitting air in the upper half of the cylinder 42 to be exhausted through the valve 52.

As the conveyor 10 moves the jigs 15 successively into position below the ram 47, each half of the jigs 15 is loaded by operators with an annulus 24, a sheath 25 and a glass member 21, in that order. Prior to being pressed by the ram 47, these components are loosely supported, merely, in the jig 15. During pressing of the glass member 21 into the sheath 25 and the annulus 24, the conveyor 10 remains stationary, to avoid tilting of the stopper and possible misalignment or damage of the components. For synchronizing the operation of the ram 47 and the movement of the conveyor 10, controls are provided substantially as illustrated diagrammatically in Fig. 5.

As will be evident from Figs. 2 and 5, the ram 47, as it moves to the extreme positions of its motion, actuates arms 57 and 58 of switches 59 and 60; the ram 47 striking the arm 57 actuating the switch 59 when in its uppermost position, and striking arm 58 actuating the normally closed switch 60 when the ram is in its lowermost position.

Switch 59 is connected by leads 61 in parallel with the circuit of motor means 14, so that when the switch 59 is actuated, it starts the motor means 14, which drives the conveyor 10, causing movement of the conveyor. One side of the switch 60 is connected by a lead 62 to one line 63 of a power source 63a and the other side of switch 60 is connected by a lead 64 to a normally open contact 65 of a relay switch 66 having a contactor 67 and an energizing coil 68.

The previously mentioned arm 41, which is actuated by the sleeves 40 (Figs. 1, 2 and 3) on the jigs 15, actuates arresting means for arresting movement of the conveyor and including a normally open switch 69, one side of which is connected by a lead 70 to the power line 63 and the other side of which is connected by a lead 71 to one end of the operating coil 68 of the relay switch 66. The opposite end of the energizing coil 68 is connected by a lead 72 to the other line 73 of the power source 63a. Thus, when the arm 41 is moved by a passing sleeve 40, it momentarily closes the switch 69, energizing the coil 68, and causing the contactor 67 to move upwardly from the position shown in Fig. 5.

The switch 60 is normally closed, and when the coil 68 is energized causing the contactor 67 to move upwardly, the contacts 65 and 86 are interconnected, completing a holding circuit for the relay switch 66, extending from power line 63, through lead 62, switch 60, lead 64, contacts 65 and 86, lead 87, coil 68, and lead 72 to power line 73.

Normally interconnected contacts 88 and 89 of the relay switch 66 are connected by leads 90 and 91 to the control circuit for the motor means 14, and when the coil 68 is energized, the energizing circuit for the motor means 14 is broken at contacts 88 and 89 causing the motor means 14 and, hence, the conveyor chain 10, to stop.

A time delay relay 75, having an operating coil 74, contactor 81 and contacts 82—85, also is controlled by the relay switch 66. When the coil 74 of the time delay relay 75 is not energized, the contacts 82 and 83 are interconnected by the contactor 81, completing the energizing circuit for the solenoid 55, extending from the power line 63 through lead 92, solenoid 55, lead 93, contacts 82 and 83, lead 94, and lead 95 to the power line 73. It will be recalled that solenoid 55 controls the valve 51 in such a manner that when the solenoid 55 is energized, air is admitted into the cylinder 42 causing the ram 47 to move upwardly.

The operating coil 74 of the time delay relay 75 is connected by a lead 76 to the power line 63 and by a lead 77 to the contact 78 of the relay switch 66. The corresponding contact 79 of the relay switch 66 is connected by a lead 80 to the other power line 73. Accordingly, when the coil 68 is energized upon closing of the switch 69, the contacts 78 and 79 are interconnected by the contactor 67, completing a circuit for energizing the coil of the time delay relay 75. After a predetermined time delay, the length of the delay being sufficient to permit the conveyor chain 10 to come to a stop, the contactor 81 of the relay 75 moves upwardly from the position shown in Fig. 5, disconnecting the contacts 82 and 83 and interconnecting the contacts 84 and 85.

When the contactor 81 interconnects the contacts 84 and 85, an energizing circuit for the solenoid 56 is completed which circuit extends from the power line 63 through lead 96, solenoid 56, lead 97, contacts 84 and 85, and lead 95 to power line 73. When solenoid 56 is energized, it operates valve 52 and permits air to enter the cylinder 42, causing the ram 47 to move downwardly.

When the ram 47 moves downwardly it moves the arm 58, and in the lowermost position of the ram 47 the switch 60 is opened, breaking the locking circuit for the relay switch 66. At the same time that the ram 47 moves downwardly, it releases the arm 57 and opens the switch 59, so that even though the relay switch 66 is released, the motor means 14 will not restart. Also, because of the fact that the conveyor 10 travels a short distance after the motor means 14 is de-energized, the sleeve 40 moves past the end of the arm 41, permitting the switch 69 to re-open. Thus, in the pressing position of each jig 15, the switch 69 is open so that the coil 68 of the relay switch 66 is de-energized when its locking circuit is broken by the switch 60.

When the relay switch 66 is released, the energizing circuit for the time delay relay 75 is broken at the contacts 78 and 79, causing the contactor 81 to disconnect the contacts 84 and 85, thus de-energizing solenoid 56, and interconnecting the contacts 82 and 83, thereby energizing the solenoid 55.

The ram 47 then moves upwardly, striking the arm 57 and closing the switch 59 which re-energizes the motor means 14, causing the conveyor 10 to move forward. The forward movement of the conveyor continues until the sleeve 40 of the next succeeding jig 15 strikes the arm 41 and causes the cycle of operations just described to be repeated.

Summarizing, the presently preferred embodiment of the invention as shown in Figs. 1–5 operates as follows:

(1) The conveyor 10 intermittently moves forward a distance equal to the spacing between the jigs 15.

(2) As the jigs 15 move forward from right to left, as viewed in Fig. 1, the jigs 15 are loaded by operators with annuli 24, sheaths 25 and glass members 21.

(3) As each jig 15 with the stopper components loaded therein arrives in pressing position under the ram 47, movement of the conveyor 10 is stopped momentarily as the ram 47 moves downwardly from its rest position shown in solid lines in Fig. 1 to its forward position shown in dotted lines in Fig. 1. Downward movement of the ram 47 presses the glass members thereunder into the associated sheaths 25 and annuli 24. After being pressed together, the components are in the assembled relationship illustrated in Fig. 3.

(4) After the stopper components are pressed together, the ram 47 moves upwardly to its rest position shown in solid lines in Fig. 1, and the conveyor 10 moves forward until the next jig 15 is in pressing position under ram 47 and the pressing operation is repeated.

(5) As the conveyor 10 passes over the sprocket 11, the jigs 15 are tilted and as they approach the inverted position indicated by the left of the two jigs 15 shown below the sprocket 11 in Fig. 1, the assembled stoppers drop into a chute 98 by which they are conveyed into a suitable storage bin (not shown).

In some cases it may be desirable to assemble the stopper components by apparatus which permits continuous movement of the stoppers along the assembly line. The alternative embodiment of this invention, as shown in Figs. 6–9, illustrates one form of apparatus which may be employed for assembling the stopper components while such components are in continuous motion.

In the embodiment shown in Fig. 6, a plurality of jigs 99 are carried by a conveyor 100 which is driven by conventional driving apparatus 101. The jigs 99 in this embodiment of the present invention are not secured to the conveyor 100 but, instead, are merely carried thereon and may be easily removed therefrom. The conveyor 100 is continuously in motion, and as the jigs 99 pass the loaders' positions 102 and 103, they are loaded successively with annuli 24 and sheaths 25. As the jigs 99 pass the loaders' position 104 they are loaded with the glass members 21 so that by the time the jigs 99 reach the inspectors' positions 105, the jigs 99 should be fully loaded with complete sets of stopper components.

The jigs 99 are inspected at the inspectors' positions 105 and, if any components are missing, the necessary components are supplied at the inspectors' positions 105 or the jigs 99 are removed from the conveyor and reloaded on the conveyor 100 ahead of the positions 102.

When the loaded jigs 99 reach the end of the conveyor 100, they are again inspected at the position 106, removed from the conveyor 100 and placed on the conveyor 107. Of course, if desired, the jigs 99 may be transferred from conveyor 100 and placed on the conveyor 107 by conventional mechanical means.

The loaded jigs 99 then pass through a conventional corking wheel or press 108 such as a corking wheel of the type manufactured by the Horix Manufacturing Co. of Pittsburgh, Pa. In the corking wheel or press 108, the glass members 21 are pressed into the sheaths 25 and the annuli 24 so that when the jigs 99 leave the press 108, the stoppers are completely assembled.

The jigs 99 are then transferred from conveyor 107 to a conveyor 109 and, at the positions 110, the assembled stoppers are removed from the jigs 99 manually. The empty jigs 99 are inspected at position 111 and the empty jigs 99 are transferred at position 112 from the conveyor 109 to the conveyor 100. The empty jigs 99 may be transferred from the conveyor 99 to the conveyor 100 either manually or by conventional mechanical transfer means.

Although the stopper components which are to be assembled may be mounted on the jigs 99 in side-by-side relationship in a manner similar to the manner in which the components are mounted in the jigs 15, it is preferred that they be mounted in alignment in the direction of movement of the conveyor 107. Accordingly, the jigs 99 may be the same in form as the jigs 15, although the jigs 99 are differently mounted on the conveyors. However, when the stopper components are pressed together by a press 108 of the type described above, it is desirable to provide additional lateral support for the glass members 21 so that these components will not be tilted during the pressing operation. In addition, the jigs 99 may differ slightly from the jigs 15 to simplify the construction thereof and to take into account the fact that it is unnecessary to secure the jigs 99 to the conveyors.

The modified construction of the jigs 99 and the relative positions of the stopper components in the jigs, before and after being pressed together, are shown in Figs. 8–9, which are fragmentary side elevation views, partly in cross-section, of the stopper components and the jigs 99.

As shown in Figs. 8–9, each jig 99 comprises a block 113 having a plurality of communicating, coaxially disposed well-like openings 114 and 115 therein. Cushioning pads 116 of resilient material are provided at the bottom of the well-like opening 115. A centering pin 117, which is coaxially disposed within the well-like openings 114 and 115, extends upwardly from a base plate 119 attached to the bottom surface of the block 113.

An angle bracket 120 is mounted in back (with reference to the direction of movement of the jig) of each glass member 21 and is secured to the top of the block 113 by suitable means such as by screws 121. A front or leading surface of the upstanding portion of the bracket 120 is adapted to contact side portions of the head of the glass member 21 when the glass member is in vertical position substantially as shown in Fig. 8.

The corking wheel or press 108, which is shown in Fig. 7 and a portion of which is shown in Figs. 8–9, comprises a pair of wheels 122 and 123 carrying a pressing belt 124. The wheel 123 is driven by a gear mechanism comprising gear devices 125 and 126, interconnected by a shaft 127, which is slidable with respect to one of the devices 125 and 126 and driving power is supplied to the device 126 by means of the driving gear 128 which is driven by the conveyor 109. The gear device 125 and, hence, the wheel 123, are supported by a threaded shaft 129 which is in threaded engagement with a bracket 130 attached to the gear device 125. The shaft 129 is keyed to a rotatable sprocket wheel 131 but is axially slidable with respect thereto so as to permit upward movement of the device 125 and the wheel 123 in the event that the components of the stopper become jammed during the pressing thereof. Downward movement of the shaft 129 is limited by the collar 132 and upward movement of the shaft 129 is limited by the spring 133 and the washer 134, the lower end of the spring 133 abutting against a washer 135, which is held by a nut 136, threaded onto the end of the shaft 129. The sprocket wheel 131 and the gear device 126 are mounted on the supporting frame for the conveyor 109 and, hence, are held in fixed positions although the wheel 131 is rotatable with respect to the frame.

The wheel 122 is supported by a threaded shaft 137, which is in threaded engagement with a bracket 138, and which, in turn, is secured to a bearing 139 for a shaft 140 carrying the wheel 122.

The shaft 137 is keyed to a sprocket wheel 141 which is rotatably mounted on the frame supporting the conveyor 109 and the shaft 137 is rotatable by a hand wheel 142. The sprocket wheel 141 is drivingly interconnected with the sprocket wheel 131 by means of a chain 143.

The positions and diameters of the wheels 122 and 123 are so related that the contact point 144 between the belt 124 and the periphery of the wheel 123 is lower than the point 145 at which the belt 124 leaves the periphery of the wheel 122 by an amount substantially equal to the desired movement of the glass member 21 during the pressing thereof into the sheath 25 and the annulus 24.

Furthermore, the wheel 124 is driven in such a direction and at such a speed that the lower surface of that portion of belt 124 between the points 144 and 145 moves in the same direction and at the same speed as the portion of the conveyor immediately therebelow. By rotation of the hand wheel 142, both the wheels 122 and 123 may be moved upwardy or downwardly to the desired position without changing the relatively vertical spacing of the portion of the belt 124 which contacts point 144 and the portion of the belt 124 which leaves the point 145.

It will be apparent from the above that as the jigs 99 progress from the left to the right, as viewed in Fig. 7, the glass members 21 are pressed downwardly and into assembled relationship with the sheaths 25 and the annuli 24. Also, it will be apparent from the above that there is no relative movement between the glass members 21 and the surface of the belt 124 in engagement therewith during the pressing operation. However, due to the inclined relationship of the belt 124 with respect to the direction of the movement of the jigs 99, there is a small rearwardly directed force on the glass members 21 and it is for this reason that the brackets 120 are provided on the top surface of each of the jigs 99, to prevent rearward tilting of the glass members 21 during the pressing operation.

Returning again to Figs. 8–9, it will be seen that as the jigs 99 proceed from the left to the right, as viewed in Fig. 7, the stopper components are moved from the positions shown in Fig. 8 to their final positions shown in Fig. 9. Thereafter the jigs 99 pass out from under the wheel 123 with completely assembled stoppers therein.

Having thus described this invention with particular reference to the preferred form thereof and having shown and described certain modifications, it will be obvious to those skilled in the art to which the invention pertains, after understanding the invention, that various changes and other modifications may be made therein without departing from the spirit and scope of the invention, as defined by the claims appended thereto.

What it is desired to secure by Letters Patent is:

1. A machine for pressing the tubular shank of a bottle stopper component into a resilient sheath for a portion of said shank and into a resilient encircling retainer for retaining said sheath on said shank, said machine comprising a conveyor, means for driving said conveyor, a plurality of jigs mounted on said conveyor, each of said jigs comprising a member having a cavity therein for receiving said sheath and said retainer in superimposed alignment and having an aligning pin centrally disposed in said cavity and co-axial therewith, said pin being adapted to extend into the bore of said shank and to hold said shank in alignment with said sheath and said retainer, and pressing means disposed adjacent said conveyor at a predetermined pressing position therealong, said pressing means comprising contacting means movable from a rest position to a forward position, said last-mentioned means being engageable with said component and adapted to exert a force directed substantially parallel to the axis of said pin and means for controlling said pressing means and said driving means comprising arresting means for arresting movement of said conveyor, delay means operable by said arresting means, means controlled by said delay means for causing operation of said pressing means and movement of said contacting means from said rest position to said forward position, means operable by said contacting means in said forward position thereof for reversing the movement of said contacting means, means operable by said contacting means in said rest position thereof for causing operation of said driving means and movement of said conveyor and means operable by each of said jigs in said pressing position for causing operation of said arresting means.

2. A machine for assembling the components of the type of composite bottle stopper that comprises a glass member having a hollow bulbous head and, integrally formed therewith and extending therefrom, a tubular shank, the bore of said shank communicating at one end with the interior of said head and being open at the other end, said shank being provided with a circumferentially extending groove formed in its outer surface near the open end thereof; a tubular sheath of resilient material, positioned upon and extending along said shank, abutting at one end against the head and having its opposite end near the grooved portion of the shank; and a resilient annulus, received upon the open end portion of the shank and engaging with the end of the resilient sheath, provided with an integrally formed rib extending radially inward, engaging with the grooved portion of the shank whereby it is locked in position thereon and a compressive force is applied axially to the resilient sheath; said machine being comprised of a horizontally disposed rigidly supported work surface; pressing means for applying a predetermined degree of compressive force normally to said work surface against articles positioned thereon; a conveyor for moving articles onto said work surface; a plurality of work jigs, adapted to being positioned upon and engaged with said conveyor, each of said jigs comprising a substantially flat, horizontally disposed block having a plurality of vertically extending well-like openings formed therein adapted to receive and support in superimposed vertical axial alignment the resilient annulus and resilient tubular sheath stopper components, resilient cushioning pads disposed at the bottoms of the well-like openings, a plurality of vertically extending centering pins mounted in said block at the bottoms of the well-like openings and extending axially upwardly therein, adapted to being received in the tubular shanks of the glass members for supporting them during the assembling operation; means for driving said conveyor; means for controlling said pressing means and said driving means comprising arresting means for arresting movement of said conveyor; delay means operable by said arresting means, means controlled by said delay means for causing operation of said pressing means toward said work surface, means operable by said pressing means in a first predetermined position thereof for reversing the movement of said pressing means, means operable by said pressing means in a second predetermined position more remote from said work surface than said first position for causing operation of said driving means and movement of said conveyor and means operable by said each of said jigs when positioned on said work surface for causing operation of said arresting means.

References Cited in the file of this patent

UNITED STATES PATENTS

| | | |
|---|---|---|
| 1,298,172 | Bush | Mar. 25, 1919 |
| 1,964,434 | Holmes et al. | June 26, 1934 |
| 2,361,783 | McLaughlin | Oct. 31, 1944 |
| 2,477,859 | Burge et al. | Aug. 2, 1949 |
| 2,720,735 | Ruehl et al. | Oct. 18, 1955 |